May 29, 1956 C. O. LUND 2,747,525
PROCESS OF MAKING FROZEN CONFECTIONS
Filed Feb. 20, 1948
Fig.1.
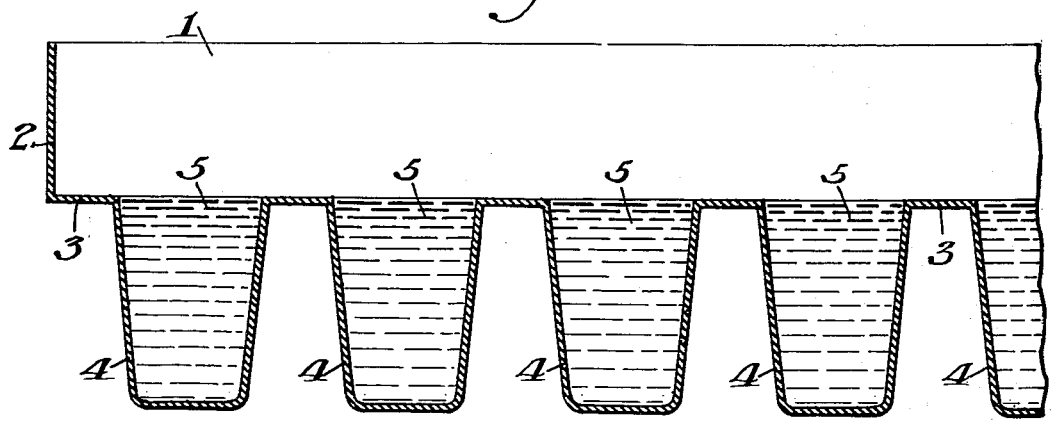
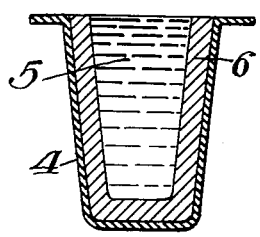
Fig.2.
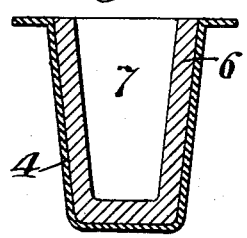
Fig.3.
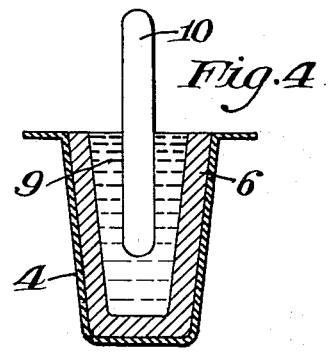
Fig.4.
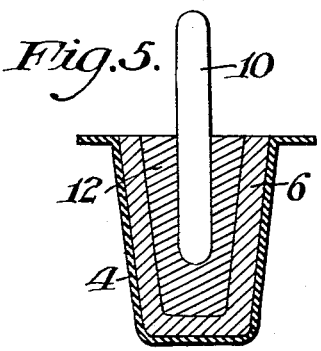
Fig.5.
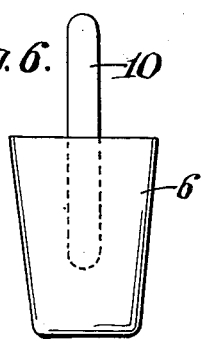
Fig.6.
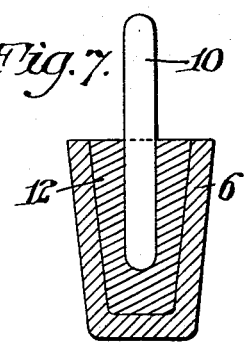
Fig.7.
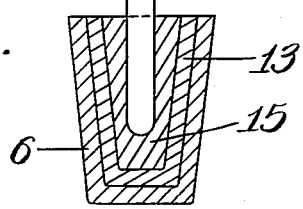
Fig.8.
Inventor:
Clinton O. Lund,
By James E. Baker
Attorney.

2,747,525
Patented May 29, 1956

2,747,525
PROCESS OF MAKING FROZEN CONFECTIONS

Clinton O. Lund, Chicago, Ill.

Application February 20, 1948, Serial No. 9,751

3 Claims. (Cl. 107—54)

My invention relates to the process of making frozen confections composed of a plurality of layers, or bodies, of differently flavored edible substances. Ice cream, water ice, etc. when frozen on a stick, or handle, imbedded in the edible substance, are known in the trade generally as " frozen stick confections." When composed of ice cream, the frozen stick confection is known in the trade as an "ice cream piece;" when composed of water ice, the frozen stick confection is known in the trade as a "water ice piece;" etc.

Frozen stick confections are of various types, such as a piece composed entirely of ice cream of some particular flavor; or a piece composed entirely of water ice of some particular flavor; or a piece composed entirely of frozen ice cream of some particular flavor and thereafter dipped in some other edible substance, such as a liquid chocolate, etc., to give the piece a relatively thin coating of chocolate, etc.

Another type of frozen stick confection is a piece composed of an inner body of ice cream of some particular flavor and an outer body, or substantially thick covering, of a differently flavored edible substance, such as a water ice of some particular flavor, or a fudgelike edible substance, or a butter scotch mixture edible substance, etc. My invention relates particularly to the process of making frozen confections of the last described type.

The prior art process of making frozen stick confections composed of an inner body of, say, ice cream and a substantially thick outer covering of a different edible substance, such as water ice, etc., is a laborious process which involves the use of two separate molds which have different size mold pockets. One mold is provided with smaller mold pockets of the desired size of the inner body of, say, ice cream, and the other mold is provided with larger mold pockets of the desired size of the piece as ultimately covered with a different edible substance, such as water ice, etc.

When frozen stick confections are made by the prior art process involving the use of two different size molds; the mold having smaller size pockets for the inner body of, say, ice cream is filled with an ice cream mix and sticks are positioned, by the use of a stickholder of one of the well known types, in the liquid mix in each mold pocket so that when the ice cream mix has been frozen by immersing the mold in a brine tank in the well known manner, the ice cream becomes frozen or bonded to the stick. Each of the individual larger size mold pockets of the larger mold is then about half-filled with a fluid mixture of water ice, or some other edible substance. When the ice cream in the smaller size pocket mold has been fully frozen, the smaller mold is defrosted and a frozen ice cream piece is suspended by the use of the stick-holder, within each larger size mold pocket half filled with, for example, a liquid water ice mixture. Assuming that the smaller mold pocket in which the inner body of ice cream has been formed is of two fluid ounce capacity, and that the larger mold pocket is of four fluid ounce capacity; when an inner body of frozen ice cream formed in the smaller mold is placed within each larger mold pocket half filled with a fluid mixture of water ice, the liquid water ice mixture is displaced by the frozen ice cream to such extent as to cause the liquid water ice mixture to rise to the top of the mold pocket and fully surround the frozen ice cream inner body. The larger mold, with the frozen ice cream surrounded by a liquid water ice mixture, is then immersed in the well known manner in a brine tank until the liquid water ice mixture has become completely frozen. This second larger mold is then defrosted, and the completely frozen pieces composed of an inner body of ice cream surrounded by a substantially thick outer covering of a different edible substance are removed.

One feature of my invention is that frozen confections composed of a plurality of different layers, or bodies, of differently flavored edible substances may be made by my improved process in a single mold provided with mold pockets of the desired size of the ultimate piece as composed of an inner body of, say, ice cream, and an outer body, or substantially thick covering, of, say, water ice.

Another feature of my invention is that frozen confections composed of a plurality of layers, or bodies, of differently flavored edible substances may be made by my process in the same standard size molds as are used in the making of frozen stick confections composed entirely of an edible substance of one flavor, such as ice cream, water ice, etc.

Another feature of my invention is that by the use of my improved process an operator with the use of the same mold may vary at will the volumetric contents of both the inner body of, say, ice cream of some particular flavor and the outer body of a differently flavored edible substance.

Another feature of my invention is that by the use of my improved process an operator may produce in such a single mold frozen confections composed not only of two layers, or bodies, of differently flavored edible substances, but at will may produce a frozen confection composed of three or more layers, or bodies, of differently flavored edible substances.

Another feature of my invention is that by the use of my improved process the labor and time involved in making frozen confections composed of a plurality of layers, or bodies, of differently flavored edible substances are very materially reduced.

Another feature of my invention is that by the use of my improved process one mold defrosting operation of any prior art process is eliminated, with a resultant reduction in the factory cost of producing a frozen confection composed of a plurality of layers, or bodies, of differently flavored edible substances.

Another feature of my invention is that by the use of my improved process it is possible to form frozen confections from differently flavored edible substances of which none needs to be a fatty substance, the use of which increases the material cost of the finished product.

The accompanying drawings show somewhat diagrammatically the progressive steps in my improved process as a frozen confection composed of a plurality of differently flavored edible substances is formed in a single mold.

In said drawings, Fig. 1 is a somewhat diagrammatic longitudinal sectional view of a portion of an ordinary well known type of frozen stick confection mold which is provided with a multiplicity of individual mold pockets. Such molds usually include four rows of six individual mold pockets, or twenty-four individual mold pockets per mold. The mold pockets of the mold indicated in Fig. 1 are shown as filled with a fluid mixture of water ice, or some other edible substance, of which the outer body of the piece is to be composed.

Fig. 2 is a sectional view of a single one of the mold pockets after the mold with the mold pockets filled as shown in Fig. 1, has been immersed in a brine tank for a time sufficiently long as to produce a frozen outer body of the desired thickness within each mold pocket, but with the mixture in an unfrozen liquid state within such frozen outer body.

Fig. 3 is a sectional view of said single mold pocket after the unfrozen liquid has been removed from the mold pocket to leave only the frozen outer body in the mold pocket.

Fig. 4 is a sectional view of said single mold pocket with the empty portion within the frozen outer body filled with a liquid mixture of a differently flavored edible substance, such as ice cream, and with a stick positioned within such liquid ice cream mixture.

Fig. 5 is a sectional view of said single mold pocket after the liquid mixture of the inner body has been completely frozen by re-immersing the mold in the brine tank.

Fig. 6 is an elevation of a frozen stick confection as removed from the individual mold pocket after the mold has been defrosted.

Fig. 7 is a vertical sectional view of the structure shown in Fig. 6.

Fig. 8 is a vertical sectional view of a completely frozen stick confection, as removed from an individual mold pocket, composed of a number of layers greater than as shown in Fig. 7.

Referring to said drawings; the frozen stick confection mold 1 indicated in Fig. 1 is of the well known construction as is used commonly in the art in the manufacturing of frozen stick confections composed of an edible substance of some one flavor. Said mold 1 is rectangular in shape and includes an upper flange portion 2 and intermediate transverse web member 3. A series of open top individual mold pockets 4 depend from the web member 3 and are in integral relationship therewith. Each of the mold pockets 4 is of the same volumetric capacity, say, three ounces, or three and one-half ounces, or four ounces, etc. The mold 1 and mold pockets 4 usually are formed from sheet copper, with the mold and pockets completely tinned after fabrication of the complete mold. Of course, the mold and pocket may be formed of any desired material and formed in any desired manner.

The first step in my improved process is to fill the individual mold pockets 4 with a liquid mixture 5, such as a liquid water ice mixture, of the edible substance of which the outer body, or substantially thick coating, is composed. Most of such liquid water ice mixtures have a freezing point of approximately 22° to 24° F. The individual mold pockets 4 may be filled in any desired manner, such as by filling the interior of the mold 1 with the liquid mixture to a line above the upper level of the pockets 4, and then removing the excess liquid mixture by means of a regulator pump. If desired, each of the pockets 4 may be filled individually to its top edge, or the pockets 4 may be filled in any other manner.

With each of the mold pockets 4 filled with liquid mixture 5, the mold 1 is then submerged in a brine tank (not shown), or subjected to any other suitable freezing medium, in the manner well known in the art. The contents 5 of the mold pockets 4 are subjected to the freezing action of the freezing medium for a period of time sufficiently long to produce a frozen shell, or outer body, as indicated by the reference mark 6 in Figs. 2 to 8, of the desired thickness on the inside of the mold pockets 4. For example, I have found that if a standard form of mold provided with standard 3 ounce mold pockets be submerged in brine at a temperature of about minus 25° F. for a period of 1¼ to 1½ minutes, an outer shell of a fluid content of approximately 1½ ounces will be formed within each three ounce mold pocket.

When the shell 6 is of the desired thickness, the mold 1 is then removed from the freezing medium and the unfrozen liquid 5 withdrawn from the mold pockets 4 by any convenient means, such as by the use of a regulator pump previously mentioned. Of course, the unfrozen liquid mixture may be poured or dumped from the mold 1 into another receptacle by the operator. If poured or dumped into another receptacle, care must be taken to assure that any brine solution adhering to the outer surface of the mold 1 does not fall into and contaminate the liquid mixture.

When the unfrozen liquid 5 has been withdrawn from the mold pockets 4, the frozen shell 6 remains frozen within the pocket 4, as indicated in Fig. 3. The space 7 within the frozen shell 6 in each mold pocket 4 is then filled with a liquid mixture of a differently flavored edible substance, such as a liquid ice cream mixture, as indicated at 9 in Fig. 4. The space 7 within the frozen shell 6 of each mold pocket 4 may be filled with a liquid ice cream mixture 9 in the same manner as has been heretofore described with reference to the initial filling of the mold pockets 4 with the liquid mixture 5. When the shells 6 have been filled with the liquid mixture 9 of which the inner body is composed, a stick 10 may be inserted in the liquid mixture 9 in each mold pocket 4 by means of any of the well known stickholder devices (not shown) as are commonly used in the art.

The mold 1 is then again subjected to the freezing action of the freezing medium for a period of time sufficiently long to freeze the liquid mixture 9 to form a frozen inner body 12, as indicated in Fig. 5. When the frozen stick confection has been completely frozen to the desired degree of hardness, the mold 1 is removed from the freezing medium, and the mold 1 defrosted in the manner well known in the art, and the frozen stick confections, as indicated in Fig. 6, dumped from the mold 1.

Although I have described my improved process with reference to its use in forming frozen stick confections, it is to be understood, of course, that the inclusion or non-inclusion of a stick in the piece forms no part of my invention. Of course, frozen confections which do not include a stick, or handle, may be made as readily by the use of my improved process. Although I have described my improved process with reference to the making of a frozen stick confection composed of two differently flavored edible substances, it is obvious that frozen confections of more than two differently flavored substances may be made in the same single mold by the use of my process by the freezing of one or more additional shells within the outer shell 6. Such additional inner shells would be formed in the same manner as heretofore described for the formation of the outer shell 6, with the frozen outer shell 6 forming the mold in which an additional shell is formed, etc.

For example, in Fig. 8 I have shown a frozen stick confection composed of three differently flavored substances as made in the same single mold by the use of my process. The outer shell 6 is first formed as heretofore described. The intermediate shell 13 is then formed in the outer shell 6 from a differently flavored edible substance, such as from a liquid vanilla ice cream mixture. Then the space within the second frozen layer 13 is filled with a third liquid mixture of an edible substance flavored differently than said second liquid mixture, such as a liquid strawberry ice cream mixture. The mold, with the frozen layers and third liquid mixture, is then subjected to the freezing action of a freezing medium for a period of time sufficiently long to form a frozen inner body 15 from the third liquid mixture, and to additionally freeze said outer frozen layers 6 and 13, to the desired degree of hardness.

Therefore, it is obvious that various modifications may be made in my improved process without departing from the essential features thereof, and I do not desire to limit myself to the precise details of the process as herein described.

I claim:

1. The process of making a frozen confection composed of a plurality of layers of differently flavored edible substances, consisting in filling a multiplicity of mold pockets of a mold with a liquid mixture of the edible substance of which the outer layer of the frozen confections is to be composed; subjecting said mold, with said liquid mixture in said mold pockets, to the freezing action of a freezing medium for a period of time sufficiently long to produce a frozen layer of the desired thickness of said liquid mixture on the inside of each of said mold pockets, and with a portion of said liquid mixture within said frozen layer remaining in an unfrozen liquid state in each of said mold pockets; removing the unfrozen remaining portion of the liquid mixture from within said frozen layers in said mold pockets; filling the space within said frozen layer with a second liquid mixture of an edible substance flavored differently than said first liquid mixture; subjecting said mold, with said frozen layer and second liquid mixture in said mold pockets, to the freezing action of a freezing medium for a period of time sufficiently long to freeze a second frozen layer of the desired thickness of said second liquid mixture within said first frozen layer, and with a portion of said second liquid mixture remaining in an unfrozen state within said second frozen layer; removing the unfrozen remaining portion of said second liquid mixture from within said second frozen layer; filling the spaces within said second frozen layers with a third liquid mixture of an edible substance flavored differently than said second liquid mixture; subjecting said mold, with said frozen layers and third liquid mixture in said mold pockets, to the freezing action of a freezing medium for a period of time sufficiently long to freeze said third liquid mixture, and additionally freeze said outer frozen layers, to the desired degree of hardness; whereby, a composite frozen edible substance composed of a plurality of layers of differently flavored edible substances is formed for removal as an integral unit from said mold.

2. The process of making a frozen confection composed of a plurality of layers of differently flavored edible substances, which are normally liquid at temperatures above the freezing point of water, consisting in filling a multiplicity of mold pockets of a mold with a liquid mixture of the edible substance of which the outer layer of the frozen confections is to be composed, said liquid mixture having a freezing point below the freezing point of water; subjecting said mold, with said liquid mixture in said mold pockets, to the freezing action of a freezing medium for a period of time sufficiently long to produce a frozen layer of the desired thickness of said liquid mixture on the inside of each of said mold pockets, and with a portion of said liquid mixture within said frozen layer remaining in an unfrozen liquid state in each of said mold pockets; removing the unfrozen remaining portion of the liquid mixture from within said frozen layers in said mold pockets; freezing in the same manner a plurality of succeeding frozen layers of differently flavored edible liquid mixtures, said liquid mixtures having freezing points below the freezing point of water, within said frozen layer until a solid frozen confection has been formed finally by freezing all of the last used liquid mixture; whereby, a composite frozen edible substance composed of a plurality of layers of differently flavored edible substances is formed for removal as an integral unit from said mold.

3. The process of making a composite frozen edible substance composed of a plurality of layers of differently flavored edible substances, which are normally liquid at temperatures above the freezing point of water, consisting in filling a mold with a liquid mixture of the edible substance of which the outer layer of the composite frozen edible substance is to be composed, said liquid mixture having a freezing point below the freezing point of water; subjecting said mold, with said liquid mixture therein, to the freezing action of a freezing medium for a period of time sufficiently long to produce a frozen layer of the desired thickness of said liquid mixture on the inside of said mold, and with a portion of said liquid mixture within said frozen layer remaining in an unfrozen liquid state; removing the unfrozen remaining portion of the liquid mixture from within said frozen layer; freezing in the same manner a plurality of succeeding frozen layers of differently flavored edible liquid mixtures, said liquid mixtures having freezing points below the freezing point of water, within said frozen layer until a solid frozen confection has been formed finally by freezing all of the last used liquid mixture; whereby, a composite frozen edible substance composed of a plurality of layers of differently flavored edible substances is formed for removal as an integral unit from said mold.

References Cited in the file of this patent

UNITED STATES PATENTS

| | | |
|---|---|---|
| 1,138,929 | Boyd | May 11, 1915 |
| 2,007,572 | Jancsy | July 9, 1935 |
| 2,172,182 | Thomas | Sept. 5, 1939 |
| 2,212,863 | Hughes | Aug. 27, 1940 |
| 2,214,374 | Hughes | Sept. 10, 1940 |